Sept. 1, 1936.    G. L. CUNNINGHAM    2,053,066
MANUFACTURE OF ANHYDROUS SODIUM SULPHATE
Filed Jan. 30, 1934
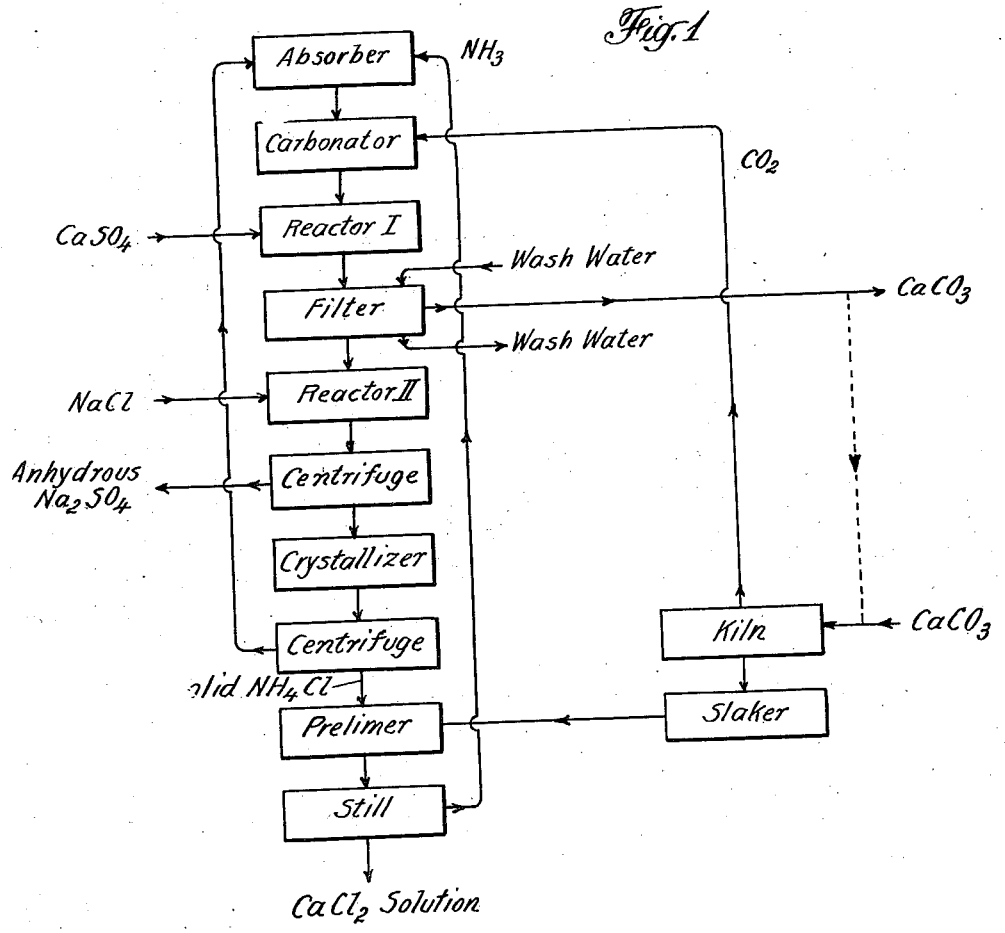
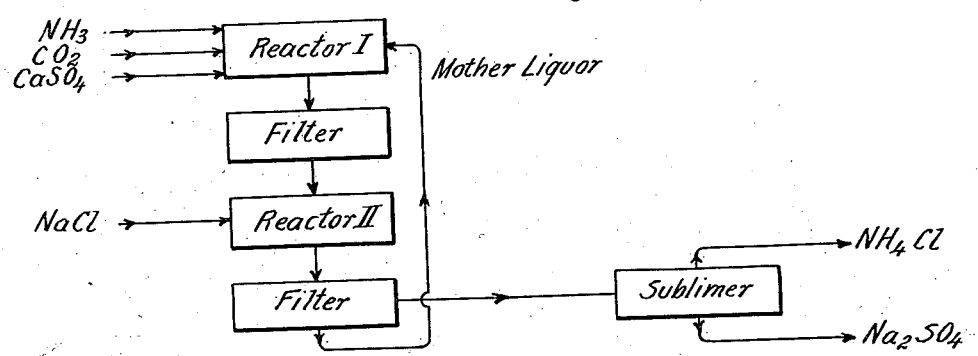
INVENTOR
George L. Cunningham
BY
Pennie, Davis, Marvin & Edmonds
ATTORNEYS Patented Sept. 1, 1936

2,053,066

UNITED STATES PATENT OFFICE 2,053,066

MANUFACTURE OF ANHYDROUS SODIUM SULPHATE

George Lewis Cunningham, Niagara Falls, N. Y., assignor to The Mathieson Alkali Works, Inc., New York, N. Y., a corporation of Virginia Application January 30, 1934, Serial No. 708,985

6 Claims. (Cl. 23—121)

This invention relates to improvements in the manufacture of anhydrous sodium sulphate. The invention comprises a novel combination of steps forming a cyclic process which enjoys several important advantages.

The process of the invention comprises, in combination, the following steps: (1) ammoniation and carbonation of an aqueous liquor containing in solution chlorides and sulphates of sodium and ammonium, (2) reaction of calcium sulphate with this liquor to precipitate calcium carbonate, (3) separation of precipitated calcium carbonate, (4) reaction of the liquor remaining after separation of precipitated calcium carbonate with sodium chloride, (5) separation of sodium sulphate and ammonium chloride from the resulting liquor and (6) return of the liquor remaining after separation of the sodium sulphate and ammonium chloride to the first step. The first two steps may be carried out separately or together; the calcium sulphate may be added to the liquor before, during or after the ammoniation and carbonation. The fifth step, separation of sodium sulphate and ammonium chloride, may be carried out as a single operation to separate a mixture of the two or as two operations, a separation at a temperature above that at which ammonium chloride precipitates to recover sodium sulphate and a subsequent separation at lower temperature to recover ammonium chloride.

It has been proposed to produce sodium sulphate by reaction between ammonium sulphate and sodium chloride in an aqueous medium followed by evaporation to precipitate sodium sulphate and cooling to precipitate ammonium chloride. It has also been proposed to produce ammonium sulphate by reaction between calcium sulphate and ammonium carbonate in an aqueous medium followed by filtration to separate precipitated calcium carbonate and subsequent evaporation and cooling to precipitate ammonium sulphate.

The combination of steps forming the process of this invention, however, eliminates any necessity for evaporation of the cyclically circulated liquor in which the reactions involved are effected and also eliminates any necessity for isolation and separate recovery of ammonium sulphate. The process of this invention makes possible the recovery of sodium sulphate, and of ammonium chloride as well if desired, in substantially anhydrous condition without requiring evaporation of the liquor from which these salts are precipitated at any point in the cycle.

According to the present invention, ammonia and carbon dioxide are dissolved in an aqueous liquor containing in solution chlorides and sulphates of sodium and ammonium, for example to form a liquor substantially saturated with respect to sodium sulphate, ammonium chloride, sodium chloride, ammonia and carbon dioxide at 25° C., calcium sulphate is reacted with the resulting liquor to precipitate calcium carbonate, the precipitated calcium carbonate is separated from the liquor, for example by filtration, the liquor remaining after separation of precipitated calcium carbonate, containing a substantial proportion of ammonium sulphate and small proportions of sodium sulphate, ammonium chloride and sodium chloride, is reacted with sodium chloride to form sodium sulphate by reaction between the ammonium sulphate of the liquor and the added sodium chloride, sodium sulphate and ammonium chloride are separated from the resulting liquor, for example by filtration or by centrifuging, and the liquor remaining after separation of sodium sulphate and ammonium chloride is returned to the first-mentioned step. By carrying out the sodium chloride reaction at a temperature above that at which ammonium chloride precipitates, and by effecting the separation of the sodium sulphate formed from the liquor at a temperature above that at which ammonium chloride precipitates, for example 75°–80° C., anhydrous sodium sulphate can be directly recovered in a state of high purity and the ammonium chloride formed can be recovered from the liquor remaining after separation of the sodium sulphate by cooling. The sodium sulphate and ammonium chloride may, however, be precipitated as a mixture and, after separation, the sodium sulphate subsequently separated from the precipitated mixture, for example, by lixivation of the ammonium chloride.

The following example will illustrate the invention.

Example I 32.8 parts (by weight) of finely divided gypsum or 26 parts of finely divided anhydrite, are dispersed in a liquor consisting of 100 parts water, 32.89 parts ammonium chloride, 6.42 parts sodium chloride and 23.5 parts sodium sulphate. Ammonia is passed through this slurry until 8.18 parts of ammonia have been absorbed. Carbon dioxide is then passed into the slurry until 10.6 parts of carbon dioxide have been absorbed. 24.2 parts of calcium carbonate are separated from the resulting slurry by filtration at a temperature of 60° C. The separated calcium carbonate is washed with water; the wash-water may be made a part of the liquor in which the gypsum or anhydrite is dispersed. 28.15 parts of sodium chloride are added to the liquor remaining after separation of calcium carbonate and the temperature of the reaction mixture is raised to 80° C. About 34 parts of anhydrous sodium sulphate are separated from the resulting liquor by filtration or centrifuging at a temperature of 80° C. The liquor remaining after separation of sodium sulphate is cooled to 25° C. and 25.77 parts of ammonium chloride are separated from the resulting liquor by filtration. The liquor remaining after separation of ammonium chloride contains about 100 parts water, 32.89 parts ammonium chloride, 6.42 parts sodium chloride and 23.5 parts sodium sulphate and is re-used in the first-mentioned step.

Approximately the maximum yields per cycle of sodium sulphate and ammonium chloride are obtained in the operation of the foregoing example. The same operation may be carried out using reduced proportions of calcium sulphate, ammonia and carbon dioxide per cycle but with correspondingly reduced yields of sodium sulphate and ammonium chloride. The proportions in which ammonia, carbon dioxide and calcium sulphate are used, do not have to satisfy the equation:

$$H_2O + 2NH_3 + CO_2 + CaSO_4 \rightarrow CaCO_3 + (NH_4)_2SO_4$$

The molecular ratios $NH_3:SO_4$ and $CO_2:CaSO_4$ are both with advantage maintained at values not less than 1:1 but these ratios may with advantage somewhat exceed this value, the ammonia and the carbon dioxide being recoverable while the calcium sulphate is not. It is also advantageous to have the molecular ratio $CO_2:NH_3$ somewhat exceed the value 1:1, as the decomposition of the calcium sulphate is thus expedited.

The following example will further illustrate the invention:

Example II 32.8 parts of finely divided gypsum or 26 parts of finely divided anhydrite are dispersed in a liquor consisting of 100 parts water, 32.89 parts ammonium chloride, 6.42 parts sodium chloride and 23.5 parts sodium sulphate. Ammonia is passed through this slurry until 8.18 parts of ammonia have been absorbed. Carbon dioxide is then passed into the slurry until 10.6 parts of carbon dioxide have been absorbed. 24.2 parts of calcium carbonate are separated from the resulting slurry by filtration at a temperature of 60° C. The separated calcium carbonate is washed with water; the wash-water may be made a part of the liquor in which the gypsum or anhydrite is dispersed. 28.15 parts of sodium chloride are added to the liquor remaining after separation of calcium carbonate and the temperature of the reaction mixture is reduced to 25° C. A salt mixture containing 33.95 parts of sodium sulphate and 25.77 parts of ammonium chloride are precipitated and the precipitated salt mixture is separated from the remaining liquor by filtration or centrifuging. The remaining liquor is re-used in the first-mentioned step. The separated salt mixture is heated to a temperature of 350°–500° C. to separate the ammonium chloride from the sodium sulphate by sublimation.

The accompanying drawing, in the nature of flow sheets, will further illustrate the invention. The operation illustrated in Fig. 1 is similar to that illustrated in Example I, except in that the calcium sulphate reaction, carried out in "Reactor I" follows the absorption of ammonia in the "absorber" and the absorption of carbon dioxide in the "carbonator" instead of preceding these last two operations and in that operations are included for recovery of ammonia from the ammonium chloride produced and of carbon dioxide from the calcium carbonate produced. Referring to these latter operations, calcium carbonate is calcined in the "kiln" to produce carbon dioxide which is supplied to the "carbonator", lime produced in the kiln is slaked and used to decompose the ammonium chloride in the "pre-limer", ammonia recovered from the decomposed ammonium chloride in the "still" being supplied to the "absorber". The operation illustrated in Fig. 2 is the same as that illustrated in Example II, except in that the calcium sulphate reaction, the ammoniation and the carbonation are carried out together in the "Reactor I".

For operation in conjunction with the conventional ammonia-soda process, the process of this invention enjoys another important advantage in that the same plant equipment can in large measure be used for carrying out either process. In this aspect the invention improves the flexibility of such installations, making possible the production of either or both of sodium bicarbonate and sodium sulphate with substantially the same equipment.

I claim:

1. In the manufacture of anyhydrous sodium sulphate, the improvement which comprises dissolving ammonia and carbon dioxide in an aqueous liquor containing in solution chlorides and sulphates of sodium and ammonium and reacting calcium sulphate with that liquor to precipitate calcium carbonate, separating precipitated calcium carbonate, reacting the liquor remaining after separation of precipitated calcium carbonate with sodium chloride, separating sodium sulphate and ammonium chloride from the resulting liquor, and returning the liquor remaining after separation of sodium sulphate and ammonium chloride to the first-mentioned step.

2. In the manufacture of anhydrous sodium sulphate, the improvement which comprises dissolving ammonia and carbon dioxide in an aqueous liquor containing in solution chlorides and sulphates of sodium and ammonium and reacting calcium sulphate with that liquor to precipitate calcium carbonate, separating precipitated calcium carbonate, reacting the liquor remaining after separation of precipitated calcium carbonate with sodium chloride, separating a mixture of sodium sulphate and ammonium chloride from the resulting liquor, returning the liquor remaining after separation of the mixture of sodium sulphate and ammonium chloride to the first-mentioned step, and subliming ammonium chloride from the separated mixture of sodium sulphate and ammonium chloride.

3. In the manufacture of anhydrous sodium sulphate, the improvement which comprises dissolving ammonia and carbon dioxide in an aqueous liquor containing in solution chlorides and sulphates of sodium and ammonium and reacting calcium sulphate with that liquor to precipitate calcium carbonate, separating precipitated calcium carbonate, reacting the liquor remaining after separation of precipitated calcium carbonate with sodium chloride, separating sodium sulphate from the resulting liquor at a temperature above that at which ammonium chloride precipitates, cooling the liquor remaining after separation of sodium sulphate to precipitate ammonium chloride, separating precipitated ammonium chloride, and returning the liquor remaining after separation of ammonium chloride to the first-mentioned step.

4. In the manufacture of anhydrous sodium sulphate, the improvement which comprises dissolving ammonia and carbon dioxide in an aqueous liquor containing in solution chlorides and sulphates of sodium and ammonium and reacting calcium sulphate with that liquor in proportions such that the molecular ratio $NH_3:CaSO_4$ is not less than 1:1 and such that the molecular ratio $CO_2:CaSO_4$ is not less than 1:1, to precipitate calcium carbonate, separating precipitated calcium carbonate, reacting the liquor remaining after separation of precipitated calcium carbonate with sodium chloride, separating sodium sulphate and ammonium chloride from the resulting liquor, and returning the liquor remaining after separation of sodium sulphate and ammonium chloride to the first-mentioned step.

5. In the manufacture of anhydrous sodium sulphate, the improvement which comprises dissolving ammonia and carbon dioxide in an aqueous liquor containing in solution chlorides and sulphates of sodium and ammonium and reacting calcium sulphate with that liquor, in proportions such that the molecular ratio $CO_2:NH_3$ exceeds 1:1, to precipitate calcium carbonate, separating precipitated calcium carbonate, reacting the liquor remaining after separation of precipitated calcium carbonate with sodium chloride, separating sodium sulphate and ammonium chloride from the resulting liquor, and returning the liquor remaining after separation of sodium sulphate and ammonium chloride to the first-mentioned step.

6. In the manufacture of anhydrous sodium sulphate, the improvement which comprises reacting about 26 parts of calcium sulphate with a liquor consisting essentially of about 100 parts water, 32.89 parts ammonium chloride, 6.42 parts sodium chloride and 23.5 parts sodium sulphate in the presence of about 8.18 parts ammonia and 10.6 parts carbon dioxide, separating precipitated calcium carbonate, reacting the liquor remaining after separation of precipitated calcium carbonate with about 28.15 parts sodium chloride, separating about 33.95 parts sodium sulphate and 25.77 parts of ammonium chloride from the resulting liquor and returning the liquor remaining after separation of sodium sulphate and ammonium chloride to the first-mentioned step.

GEORGE LEWIS CUNNINGHAM.

CERTIFICATE OF CORRECTION.

Patent No. 2,053,066. September 1, 1936.

GEORGE LEWIS CUNNINGHAM.

It is hereby certified that error appears in the printed specification of the above numbered patent requiring correction as follows: Page 1, first column, line 46, after "circulated" insert the word liquor; and that the said Letters Patent should be read with this correction therein that the same may conform to the record of the case in the Patent Office.

Signed and sealed this 20th day of October, A. D. 1936.

(Seal)
Leslie Frazer
Acting Commissioner of Patents.